A. A. DENNIS.
TIRE VALVE.
APPLICATION FILED APR. 30, 1919.
1,365,820.
Patented Jan. 18, 1921.
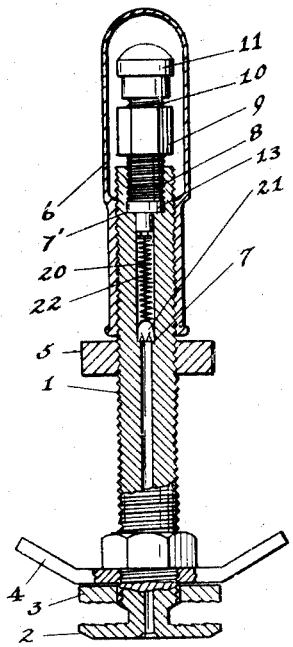
Fig. I.
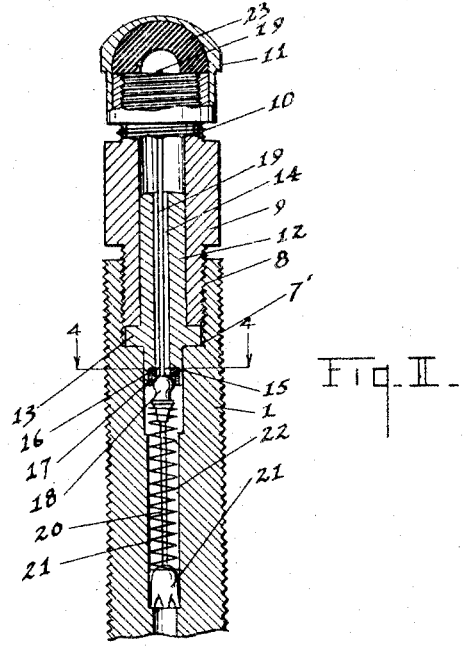
Fig. II.
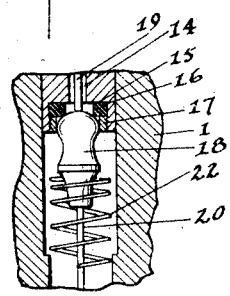
Fig. III.
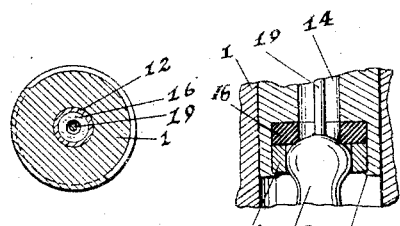
Fig. IV.       Fig. VII.
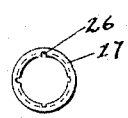
Fig. V.
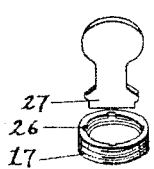
Fig. VI.
WITNESSES:
M. Louise Thurston
M. L. Glasgow.
INVENTOR.
Alfred A. Dennis.
BY Chappell & Earl
ATTORNEYS.

UNITED STATES PATENT OFFICE.

ALFRED A. DENNIS, OF GRAND RAPIDS, MICHIGAN.

TIRE-VALVE.

1,365,820.   Specification of Letters Patent.   Patented Jan. 18, 1921.

Application filed April 30, 1919. Serial No. 293,743.

*To all whom it may concern:*

Be it known that I, ALFRED A. DENNIS, a citizen of the United States, residing at Grand Rapids, county of Kent, State of Michigan, have invented certain new and useful Improvements in Tire-Valves, of which the following is a specification.

This invention relates to improvements in tire valves.

The main objects of this invention are:

First, to provide an improved tire valve which is very effective in retaining the air.

Second, to provide an improved tire valve in which the rubber or elastic valve seat may be removed when it deteriorates and a new one substituted without the necessity of renewing any other valve parts.

Third, to provide an improved tire valve which has a relatively soft or flexible seat for the valve and at the same time one in which the parts are arranged so that a free passage for the inflating air is provided.

Fourth, to provide an improved tire valve which is very simple and economical in its parts.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail view partially in longitudinal section of my improved tire valve.

Fig. II is an enlarged detail view mainly in longitudinal section of the parts shown in Fig. I.

Fig. III is an enlarged detail longitudinal section through the valve seat.

Fig. IV is a cross section on a line corresponding to line 4—4 of Fig. II.

Fig. V is an enlarged end elevation of the valve seat retaining ring.

Fig. VI is a perspective view of the valve seat retaining ring and the seating key therefor.

Fig. VII is a detail section corresponding to that of Fig. III showing the modified form of seat retaining ring.

In the drawing similar reference numerals refer to similar parts throughout the several views, and the sectional views are taken looking in the direction of the little arrows at the ends of the section lines.

Referring to the drawing, the body 1 is provided with a flange 2 at its inner end, a tube clamping nut 3, and the usual spreader 4 above which is the rim clamping nut 5. These tube and rim clamping features form no part of my present invention.

The body 1 is externally threaded to receive the dust cap 6. The longitudinal bore of the body 1 has spaced annular shoulders 7 and 7' therein, the shoulders being formed by varying the diameter of the bore. Above the shoulder 7' the body is internally threaded at 8 to receive the tubular clamping member 9. This clamping member 9 is externally threaded at 10 to receive the cap 11.

On the outer shoulder 7' I arrange a tubular valve seat member 12. This valve seat member 12 is provided with an annular flange 13 resting upon the shoulder 7'. The lower end of the clamping member 9 engages the upper side of this flange. The valve seat member 12 is provided with a longitudinal bore 14 and with a recess-like valve seat 15 at its inner end. The valve seat 16 is of washer-like form and is formed of flexible rubber. The retaining ring 17 is threaded into the valve seat recess effectively retaining the valve seat without distorting the same.

The valve 18 has an outwardly projecting stem 19 which extends through the bore 14 to be engaged for opening the valve.

The valve 18 has an inwardly projecting stem portion 20 reciprocating through the support 21 for the coiled spring 22 which is arranged on the valve stem portion 20 to rest on the support 21 and engage the valve at its upper end.

The cap 11 has a packing or gasket 23 which clamps upon the end of the member 9 forming an air-tight joint.

In the modification shown in Fig. VII, the valve seat member retaining ring 24 is retained by spinning the end of the valve seat member over the end of the ring as shown at 25.

To facilitate insertion and removal, the retaining ring 17 is notched at 26 to receive the key 27 or other tool, such as a screw driver, for inserting and removing the seat retaining ring. The valve seat member being clamped at its outer edge is not likely to be distorted or injured by unskilled workmen or by carelessness. The valve seat member may be quickly removed from the body by removing the clamping member and the valve seat quickly removed and replaced as occasion requires, that being the only part of the valve which materially deteriorates with use or age.

The ring 17 constitutes a guide for the valve, the valve being a sliding fit thereon, with clearance enough for the air. This metal to metal guide insures the sealing of the valve centrally on its rubber seat, and prevents the distortion of the seat that might occur if the valve did not seat centrally thereon.

The parts are simple and economical to produce and very quickly assembled. The valve is very effective for retaining air under pressure, as the pressure serves to force the valve firmly against the seat which may be of resilient material, so that there is no likelihood of leakage, and there is little possibility for grit or sand or other obstruction lodging and causing leakage or preventing the perfect seating of the valve.

Having thus described my invention, what I claim as new and desire to secure by Letters Patent is:

1. In a tire valve the combination with a tubular body member having an internal valve seat member support, a valve seat member disposed on said support and having a valve seat recess in its inner end, an annular valve seat of resilient material disposed in said recess, a valve seat retaining ring secured in said recess to engage the outer edge of said seat, a tubular clamping member threaded into said body member to clamp said valve seat member upon its support, and an outwardly closing valve seating against said valve seat, said seat retaining ring constituting a guide for said valve.

2. In a tire valve, the combination with a tubular body member having an internal valve seat member support, a valve seat member disposed on said support and having a valve seat recess in its inner end, an annular valve seat of resilient material disposed in said recess, a valve seat retaining ring secured in said recess to engage the outer edge of said seat, a tubular clamping member threaded into said body member to clamp said valve seat member upon its support, and an outwardly closing valve seating against said valve seat.

3. In a tire valve, the combination of a tubular body member, a valve seat member removably mounted in said body member and having a valve seat recess in its inner end, an annular valve seat of resilient material disposed in said recess, a seat retaining ring secured in said recess to engage the outer edge of said seat, and a valve seating against said valve seat, said retaining ring constituting a guide for said valve.

In witness whereof, I have hereunto set my hand and seal in the presence of two witnesses.

ALFRED A. DENNIS. [L. S.]

Witnesses:
  Henry G. Dykhouse,
  Henry G. Krekel.